United States Patent
Noldus (10) Patent No.: US 10,958,696 B2
(45) Date of Patent: *Mar. 23, 2021

(54) DEVICE-RESIDENT MEDIA FILES

(71) Applicant: Telefonaktiebolaget LM Ericsson (publ), Stockholm (SE)

(72) Inventor: Rogier Noldus, Goirle (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,018

(22) Filed: Feb. 27, 2020

(65) Prior Publication Data

US 2020/0204602 A1 Jun. 25, 2020

Related U.S. Application Data

(63) Continuation of application No. 15/664,840, filed on Jul. 31, 2017, now Pat. No. 10,616,292, which is a (Continued)

(51) Int. Cl.
*H04L 29/06* (2006.01)

(52) U.S. Cl.
CPC ...... *H04L 65/4069* (2013.01); *H04L 65/1016* (2013.01); *H04L 65/1063* (2013.01);
(Continued)

(58) Field of Classification Search
CPC ............. H04L 65/1016; H04L 65/1063; H04L 65/4069; H04L 65/1096; H04L 65/1089; H04L 65/1069

See application file for complete search history.

(56) References Cited

U.S. PATENT DOCUMENTS 10,616,292 B2 * 4/2020 Noldus ............... H04L 65/1063
2006/0291638 A1 12/2006 Radziewicz et al.
(Continued)

FOREIGN PATENT DOCUMENTS

CN 101601288 A 12/2009
CN 101867665 A 10/2010
(Continued)

OTHER PUBLICATIONS

3GPP, "3rd Generation Partnership Project; Technical Specification Group Core Network and Terminals; Customised Applications for Mobile network Enhanced Logic (CAMEL) Phase 4; Stage 2 (Release 11)", 3GPP TS 23.078 V11.2.0, Mar. 2012, pp. 1-748.
(Continued)

*Primary Examiner* — Kim T Nguyen
(74) *Attorney, Agent, or Firm* — Murphy, Bilak & Homilier, PLLC (57) ABSTRACT

A device is configured for communications over an IP network. The device comprises a user interface, a memory interface for accessing information media files stored in a memory in the device or associated with the device, and a media file streamer. The device is configured to receive an instruction from the IP network during establishment of a call, during a call, or at termination of a call, the instruction identifying one or more of the media files. The device is configured to access the identified media file from the memory via the memory interface and to stream the identified media file to convey the information in the media file via the user interface.

12 Claims, 9 Drawing Sheets

Related U.S. Application Data continuation of application No. 14/397,065, filed as application No. PCT/EP2012/057851 on Apr. 27, 2012, now Pat. No. 9,749,369.

(52) U.S. Cl.
CPC ...... *H04L 65/1069* (2013.01); *H04L 65/1089* (2013.01); *H04L 65/1096* (2013.01)

(56) References Cited

U.S. PATENT DOCUMENTS

| | | |
|---|---|---|
| 2010/0136943 A1 | 6/2010 | Hirvela et al. |
| 2010/0257273 A1* | 10/2010 | Mutikainen ............ H04L 67/14 709/227 |
| 2010/0262711 A1* | 10/2010 | Bouazizi ............ H04L 65/4084 709/231 |
| 2012/0185570 A1 | 7/2012 | Bouazizi et al. |
| 2013/0151720 A1 | 6/2013 | Klein |
| 2015/0113044 A1 | 4/2015 | Noldus |

FOREIGN PATENT DOCUMENTS

| | | |
|---|---|---|
| EP | 2408164 A1 | 1/2012 |
| WO | 2007028301 A1 | 3/2007 |

OTHER PUBLICATIONS

Rosenberg, J., et al., "SIP: Session Initiation Protocol", Network Working Group, Request for Comments 3261, The Internet Society, Jun. 2002, pp. 1-269.

\* cited by examiner

(from 3GPP TS 23.078)

DEVICE-RESIDENT MEDIA FILES

RELATED APPLICATIONS

This application is a continuation of U.S. application Ser. No. 15/664,840 filed 31 Jul. 2017, which is a continuation of U.S. application Ser. No. 14/397,065 filed 13 Nov. 2014, which is now issued as U.S. Pat. No. 9,749,369 and which is a U.S. National Phase Application of PCT/EP2012/057851 filed 27 Apr. 2012. The entire contents of each aforementioned application is incorporated herein by reference.

TECHNICAL FIELD

The present invention relates to device-resident media files in Internet Protocol (IP) based multimedia telecommunications, and particularly to their use in the playing of announcements.

BACKGROUND

IP-based telecommunications enable multimedia communications (e.g. voice, video, etc.) over IP networks. For example, the IP Multimedia Subsystem (IMS) is the technology defined by the Third Generation Partnership Project (3GPP) to provide IP Multimedia services over (mobile) communication networks. The IMS is described further below in relation to FIG. 1, which illustrates schematically how the IMS fits into the mobile network architecture in the case of a General Packet Radio Service (GPRS) access network.

A problem arises when information media (e.g. voice/audio or video) such as an announcement needs to be played to either the calling or the called party, especially when one party or both parties are connected to a visited IP network rather than to the home IP network (e.g. is located in a foreign country). In such cases the media is typically routed from a server or other entity in the subscriber's home network where the media is stored to the terminal of the served subscriber (calling or called party). This may involve routing the media over a large distance. A particular example of this problem is described below for the case of Voice over LTE (VoLTE) communications, but the problem and solutions described are not limited to such communications.

The 3GPP has also developed the System Architecture Evolution (SAE) as the evolved core network architecture, and Long Term Evolution (LTE) wireless mobile telecommunications standard as the evolved mobile radio access network. The SAE architecture is entirely IP-based, with separation of control plane and user plane. The main component of the SAE architecture is the Enhanced Packet Core (EPC). The EPC serves as the equivalent of a GPRS network. The LTE standard only supports packet switching (PS), whereas in many legacy networks voice (and other media) calls are circuit switched (CS). The adoption of LTE means that carriers have to re-engineer their voice call network, and the preferred approach is to use VoLTE (Voice over LTE), which is based on the IMS.

In IP networks in general, and particularly in the context of VoLTE, great effort is taken to optimize the media stream (user plane) for person-to-person communications. Specifically, when a voice or video call is established between a calling party that is roaming in one country to a called party in another country, the user plane (as well as the control plane) is carried directly from the country in which the calling party currently resides to the destination country, where the called party is a subscriber. The user plane and control plane traverse the IMS interconnect network (IPX).

When an announcement (or other media) needs to be played to either the calling or the called party, the media is typically routed from a Media Resource Function (MRF) in the home IMS network towards the terminal of the served subscriber (calling or called party). In the context of the present discussion an MRF encompasses both a Media Resource Function Controller (MRFC) and a Media Resource Function Processor (MRFP). There are several ways that MRFs may be deployed, such as:

1) deploying geographically distributed MRFs—for example one IMS operator may deploy an MRF in each region, e.g. Europe, North America, Asia etc.—thereby limiting the average distance between the served subscriber and the MRF.

2) deploying shared MRFs—for example, one IMS operator may allow other operators to store media files in its MRF, and the other IMS operators may then connect their served subscribers to the shared MRF.

One disadvantage of the first method is that the IMS operator has to invest in, administer and maintain a potentially large number of MRFs spread around the globe. Furthermore, even though the average distance between served user and MRF will be reduced, the resulting effective distance may still be too large to justify the playing of announcements to roaming subscribers. Moreover, the availability of a 'local MRF' may differ depending on the country where the served subscriber is currently roaming. As a result, the Multi Media Telephony (MMTel) service logic that controls the communication session has to adapt its logic processing depending on the country where the subscriber is currently residing.

A disadvantage of the second method is that administrative agreements have to be made between the respective IMS operators. Also, the availability of shared MRF media files may differ from country to country. This has the effect that the MMTel service logic has to adapt its logic processing for each country. In addition, the service for the subscriber will differ for each country.

Document EP2408164 describes a system, method and service server that can exert unified media control over various kinds of media playing services and is able to play different media resources.

Document US 2006/0291638 discloses a ringback/ringtone synchronisation system for utilizing ringtones as replacement ringback announcements.

SUMMARY

It is an object to obviate at least some of the above disadvantages and provide an improved device for telecommunications, a method of providing announcements at a device as part of a call over an IP network and an improved Multi Media Telephony, MMTel, application server. Although the problems described above refer to the context of Voice over Long Term Evolution, VoLTE, calls, the mechanisms described are applicable for any MMTel call over Internet Protocol, IP, networks, including Machine25 to-Machine (M2M) data calls, VoLTE, Video-over-LTE, and MMTel over other forms of access, such as Ethernet. Note that the IP network subscriber making the call may be 'nomadic', that is, connected to a foreign IP access network.

In accordance with a first aspect, a device is configured for communications over an IP network. The device comprises a user interface, a memory interface for accessing information media files stored in a memory in the device, before any instruction to access or play a stored media file is received from the IP network and a media file streamer. The device is configured to receive an instruction from the IP network during establishment of a call, during a call, or at termination of a call, the instruction identifying one or more of the media files. The device is configured to access the identified media file from the memory via the memory interface and to stream the identified media file to convey the information in the media file via the user interface.

The device may be further configured to inform the IP network of the information media files stored in the memory.

In accordance with a second aspect, a method of providing announcements at a device as part of a call over an IP network comprises providing the device with to one or more information media files, the device storing the media files in a memory in the device before any instruction to access or play a stored media file is received from the IP network. An instruction is sent to the device from the IP network during establishment of the call, during the call, or at termination of the call, the instruction identifying at least one of the information media files. The at least one identified information media file is streamed on the user terminal to convey the information in the media file to the device user via the user interface.

In accordance with a third aspect a Multi Media Telephony, MMTel, application server is configured to receive an indication from a device engaged in a communication session over an IP network, or during establishment of the session, of one or more information media files stored in a memory in the device, before any instruction to access or play a stored media file is received from the IP network. The MMTel application server is configured to provide an instruction to the device to stream one or more of the information media files so as to play the information therein on a user interface, the instruction identifying the information media file(s) to be played.

It is an advantage that the embodiments described herein provide a mechanism whereby a served subscriber (e.g. a VoLTE subscriber) may receive media (e.g. voice or video) announcements for a call, regardless of the country where he/she resides, or is currently located (if roaming). The method is not dependent on specific functionality in the visited IP network. In addition, the proposed method alleviates the need for long haul media transfer for announcements when the served subscriber is in a remote (foreign) country.

DETAILED DESCRIPTION

Embodiments will be described below firstly in relation to generic network architecture, and then in relation to a Voice over Long Term Evolution, VoLTE, session and IP Multimedia Subsystem, IMS, network architecture. The embodiments describe the particular case of playing announcements during a call, but the principles described are not limited to the playing of voice (i.e. audio) announcements, and may be applied to the streaming of any media data (e.g. including video).

Figure 2:
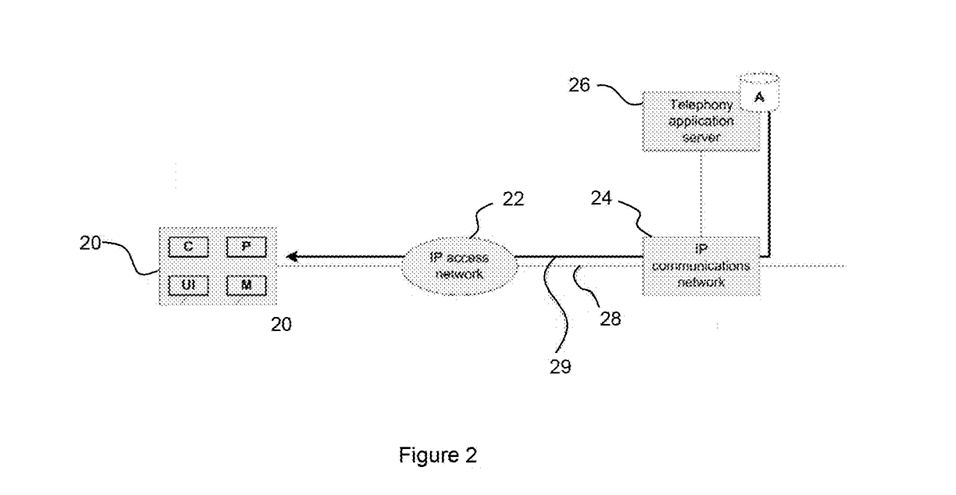
FIG. 2 is a block diagram illustrating schematically a simplified generic IP telecommunications network architecture.

FIG. 2 shows schematically simplified generic telecommunications network architecture, including a device in the form of a Multimedia communications device 20, an IP access network 22, an IP communications network 24, and a telephony application server 26. The telephony application server 26 has, or at least has access to, a memory A with permanent storage of announcement media files.

The Multimedia communications device 20 is configured for IP-based communication, such as voice communication or video communication. Device 20 may be mobile, such as a mobile terminal or a fixed device or terminal. Examples include: a desktop-based wireline VOIP phone, a PC-based softphone, and a mobile (handheld) IP communication terminal. The device 20 is functionally connected to the IP access network 22. The nature of the connection between device and access network depends on the type of device. For example, a mobile phone connects to the access network 22 through radio signaling.

The IP access network 22 serves to provide a functional connection between the device 20 and the IP communications network 24. The IP communications network 24 allows the device 20 to establish communication sessions with other users' devices that are functionally connected to the IP communications network 24, or with users' devices that are functionally connected to other communications networks.

The Telephony application server 26 is functionally connected to the IP communications network 24 and serves to establish a media (e.g. voice or video) communication session. The voice session and the video session are services that may be executed within the IP communications network 24. The execution of a voice session or a video session requires the establishment of a Telephony service relation between the device 20 and the Telephony application server 26. The execution of a voice session or a video session is further accomplished through service logic processing in both the device 20 and the Telephony application server 26.

Figure 1:
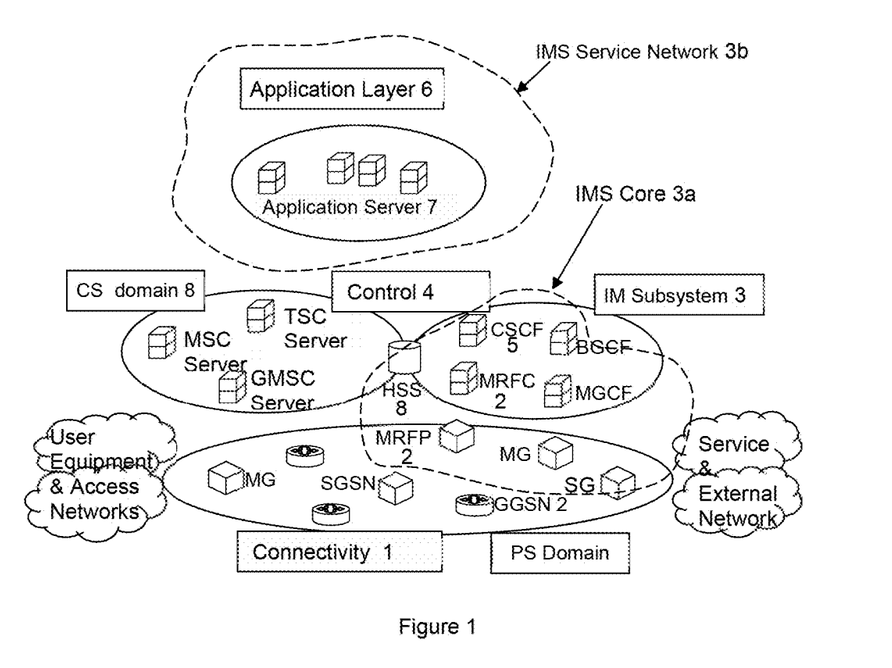
FIG. 1 is a network diagram illustrating schematically an IMS network in association with mobile network architecture of a GPRS access network.

The IP communications network 24 typically contains a multitude of functional components, deployed in one or more nodes (see, for example, the IMS network depicted schematically in FIG. 1). The IP communications network 24 may be logically divided into a Home IP communications network and a Visited IP communications network. In general, each IP communications network, be it the Home network or a visited network, serves a certain geographical region. The device 20 is associated with (e.g. belongs to) a subscriber of the Home IP communications network. The Telephony application server 26 resides in the Home IP communications network. The IP access network 22 is connected to the Visited IP communications network. When the subscriber is located in his/her Home communications region, the Visited IP communications network will be the same as the Home IP communications network. However, in general, the Visited IP communications network and the Home IP communications network may be different networks, and so there is an IP infrastructure that facilitates communication between the two networks.

Generally, two classes of communication protocols are used between the device and the IP communications network:

(1) Call control signaling: this protocol comprises signaling messages that are used for the establishment of communication sessions (and other things); and (2) Media transfer; this protocol comprises messages that are used for the transfer of media, such as digitized voice, video etc.

These signals/messages pass between the entities shown in FIG. 2 as depicted by the solid connecting line 28.

The Telephony application server 26 has access to a set of announcement files stored in a memory A, which may be used during establishment of, during, or after completion of voice or video communication sessions. The memory A storing this set of announcement files may be internal in the Telephony application server 26 or may be contained in external data storage. In the latter case, the set of announcement files may be accessible and usable by a multitude of Telephony application servers.

The principles of the mechanism for playing announcements are as follows. The device 20 contains a set of media files that are needed for an MMTel communication session. This set of media files typically comprises the standard announcements for 'Subscriber busy', 'Subscriber not reachable', 'Network congested', 'Call being forwarded', 'Call barred', 'Low credit warning' etc. The device 20 may report its announcement capability as well as the announcement media files that it has stored in its local memory to the Telephony application server 26 at the beginning of the session establishment. Alternatively, as explained further below, announcement media files may be provided to the device 20 as part of the session establishment procedure. When the MMTel service logic wants to play an announcement, it instructs the device 20 to play the required announcement. The served subscriber has now received the announcement without the need for a long distance transfer of media. This mechanism may be applied during call establishment, during an active call or at the end of a call. If the announcement is played during an active call, when the playing of the announcement is complete, the MMTel service logic instructs the device 20 to re-establish the user plane to continue the session with the remote party.

The aforementioned Telephony service relation between the device 20 and the Telephony application server 26 may be used, among other things, for the transfer of a designated subset of the announcement files to the device 20. The transfer of the announcement files may be done through the call control signalling protocol or through other communications or data transfer means. This is illustrated by the arrowed line 29 in FIG. 2.

The device 20 comprises functional components including a processor P for receiving and storing announcement files. The processor P may receive the announcement files from the Telephony application server 26 and store these in a memory M. Memory M may be a hard-wired memory device internal to the terminal 20, such as a Random Access memory (RAM), Externally Programmable Read-Only Memory (EPROM) or Hard Disk. Alternatively, the memory M may be contained in a removable device such as an Identification Module (e.g. a Universal Integrated Circuit Card, UICC). A user interface UI is provided for playing announcements to a user. The user interface UI may be integral to the terminal 20 (e.g. a built-in speaker), or may be external, such as an external speaker connected through a wire or connected wirelessly, e.g. via Blue Tooth™. A call handling function C controls voice and multimedia calls. The call handling function C is responsible for handling communication sessions. It has access to the Memory M to retrieve announcements and play these on the user interface UI. The retrieving and playing of the announcements would occur when instructed by the Telephony application server 26.

The embodiments described below relate to VoLTE calls via an IMS network.

FIG. 1 is a network diagram illustrating schematically how the IMS fits into mobile network architecture in the case of a General Packet Radio Service (GPRS) access network. The same principles apply to an EPC/LTE access. Control of communications occurs at three layers (or planes). The lowest layer is the Connectivity Layer 1, also referred to as the bearer plane and through which signals are directed to/from User Equipment (UE) devices accessing the network. The middle layer is the Control Layer 4, and at the top is the Application Layer 6.

The IMS 3 includes a core network 3a, which operates over the middle, Control Layer 4 and the Connectivity Layer 1, and a Service Network 3b. The IMS core network 3a includes nodes that send/receive signals to/from the GPRS network via a GGSN 2 at the Connectivity Layer 1 and network nodes that include Call/Session Control Functions (CSCFs) 5, which operate as SIP proxies within the IMS in the middle, Control Layer 4. A Home Subscriber Server (HSS) 8 stores details of subscriber information. Also shown in FIG. 1 are the Media Resource Function entities 2 (MRFC and MRFP referred to above). Other IMS entities not shown in FIG. 1 may include an Access Session Border Gateway (A-SBG), an Interconnect Border Control Function (IBCF), Transition Gateway (TrGW) etc. The top, Application Layer 6 includes the IMS service network 3b. Application Servers (ASs) 7 are provided for implementing IMS service functionality.

As shown in FIG. 1, User Equipment (UE) can access the IMS by attaching to an access network and then over the Connectivity Layer 1. For example, the UE may attach via an Enhanced Packet Core (EPC)/LTE access.

Figure 3:
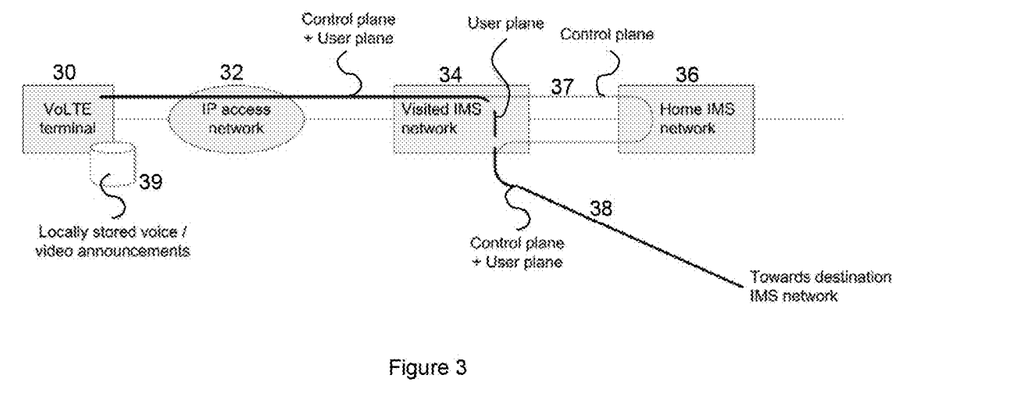
FIG. 3 is a block diagram illustrating schematically simplified network architecture for the provision of terminal-resident media for the case of VoLTE.

FIG. 3 illustrates conceptually, and in rudimentary form, architecture for the provision of terminal-resident media (such as announcements) for the case of VoLTE. The VoLTE architecture is assumed to be well known to the informed reader, although the following points should be noted. A device in the form of a VoLTE device 30 operated by an IMS subscriber is connected to a visited IMS network 34 via an IP access network 32, which may comprise LTE and EPC jointly referred to as an Enhanced Packet System (EPS). The visited IMS network 34 is functionally connected to the subscriber's Home IMS network 36. The visited IMS network 34 and Home IMS network 36 comprise functional entities as described above for FIG. 1.

Both the user plane and the control plane signaling pass directly from the device 30, through access network 32 to visited network 34, and from visited network 34 to a destination IMS network along the solid line 38. The control plane signaling between the Visited IMS network 34 and the subscriber's Home IMS network 36, as shown by line 37 traverses the IMS interconnect network (IPX—not shown). The user plane signaling passes directly through Visited IMS network 34 to the destination IMS network. IMS routing from the visited IMS network 34 to the destination IMS network requires specific support in both the Visited IMS network 34 and the Home IMS network 36. Call services over the IMS are provided by an MMTel application server that resides in the Home IMS network 36.

In accordance with the currently described embodiment, the VoLTE device 30 has access to a local memory 39 that contains a set of media files for regular VoLTE call handling. These announcements are then stored and maintained in the local memory 39 of the VoLTE device 30. The announcements may be stored in the device 30, on the UICC in a suitable data file in a SIM application—e.g. Universal (U)SIM or ISIM application—or on another data storage card associated with (contained in) the device. For example, the announcements may be transferred and stored in native 8000 Hz, 8-bit Pulse Code Modulation (PCM) format, 1 second of PCM consumes 8 kByte of data storage, so 25 announcements of average 5 s each would amount to about 1 MByte of data, which is well within data storage limits of current mobile devices.

The transfer of the media files from the IMS Home network 36 to the VoLTE device 30 may use the File Transfer Protocol (FTP). The VoLTE device 30 is equipped with a terminal configuration program, and to download the media files, an FTP address (ftp://) is sent to the device 30. The device 30 can then retrieve (a replica of) the files using FTP.

When the VoLTE device 30 establishes a multimedia telephony session, either as the originating terminal or as the terminating terminal, it reports to the MMTel application server its capability for local announcement streaming as well as the announcements it has available in the local memory. This reporting may be done as in the following example:

```
Originating voice/video call
INVITE sip:john.smith@my-company.com SIP/2.0
...
Supported: 100rel, media_streaming!ims.vodafone.uk/media_files/mmtel/mmtel-files-
v03.07.12
Terminating voice/video call
SIP/2.0 200 Ok
...
Supported: 100rel, media_streaming!ims.vodafone.uk/media_files/mmtel/mmtel-files-
v03.07.12
```

These include: announcements that are typically used during call establishment; announcements that may be used during a call; and announcements that may be used at the end of a call. Note that, in accordance with prior art procedures, the MMTel application server may store this set of announcements in a Media Resource Function Processor (MRFP) in the Home IMS network. However, in accordance with the current proposed methodology, the local memory 39 contains a replica of this set of announcements.

The local memory 39 may be memory in the VoLTE device 30, or memory in a UICC insertable into the device. Before the VoLTE device 30 is ready to be used for establishing multimedia (e.g. voice & video) calls, it needs to be personalized. This involves programming the VoLTE device 30 with personal information, such as IMS Public user identity/identities (IMPU), IMS Private user identity (IMPI), Home IMS network domain name etc. as well as with designated configuration files and designated files that may exist in an IP Multimedia Services Identity Module (ISIM) application on the UICC. This programming may be done with the Over-the-air (OTA) methodology, in which the IMS operator programs the device and the ISIM application remotely, through the mobile radio access network. OTA is a well known technique and is an accepted method for programming VoLTE devices.

In the present embodiment, the programming of the VoLTE device 30, to prepare it for normal operation, also comprises downloading of the set of media files that include the announcements. Typically, a set of about 25 announcements may be used for regular telephony. The announce- The string 'media_streaming!ims.vodafone.uk/media_files/mmtel/mmtel-files-v03.07.12' forms an option tag for the Supported header. The Internet Engineering Task Force (IETF) RFC 3261, sections 8.1.1.9 and 20.37 include a description of the Supported header. The meaning of the option tag in this example is as follows:

| | |
|---|---|
| media_streaming | This token identifies the capability of the terminal to provide local announcements; |
| ! | This character serves as a delimiter; |
| ims.vodafone.uk | This is the home IMS network of the subscriber. The set of media files is owned and distributed by this IMS network; |
| /media_files/mmtel/ | This constitutes a directory structure for the announcement files; |
| mmtel-files-v03.07.12 | This is the name, including version number, of the file containing the announcements. |

When the session is established, the MMTel application server can then determine which announcement media files are available. If the terminal does not report its announcement capability, or if the required media files (e.g. v03.07.10 or later is required) are not available in the terminal, then the MMTel application server may revert to prior art methods such as not playing an announcement or establishing an (international) user plane connection to an MRF in the Home IMS network.

When a network operator has new announcement(s) available, the OTA provisioning system may be used to send an OTA notification to the served VoLTE terminals to update their stored announcement files. The VoLTE terminals of this operator will then have the required announcements available.

The following examples describe the playing (streaming) of an announcement during a VoLTE call.

Figure 4:
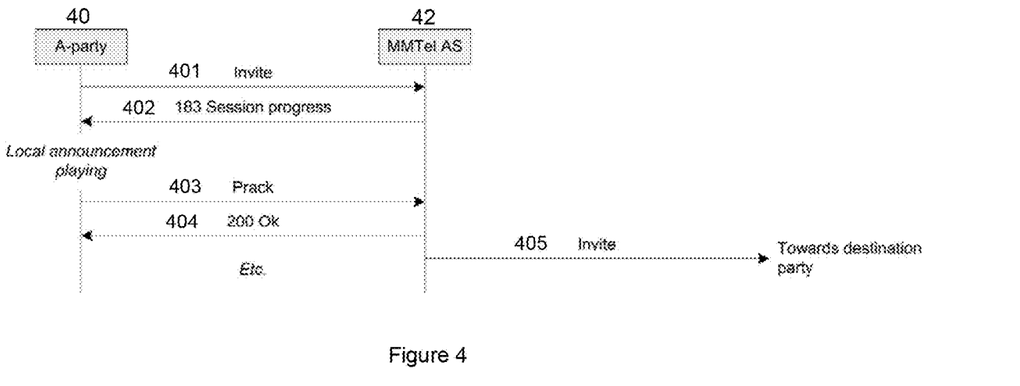
FIG. 4 is a signaling diagram illustrating the procedure for playing a pre-call announcement.

FIG. 4 is a signaling diagram illustrating the playing of a pre-call announcement—i.e. an announcement that is made to a calling A-party 40 prior to completion of the call establishment procedure. The signalling is shown up to the forwarding of the Session Initiation Protocol (SIP) Invite request towards the destination party by a MMTel AS 42. The A-party 40 is using a device (such as VoLTE device 30 described above in relation to FIG. 3) that comprises a SIP User Agent (UA). The diagram is a simplification as the functional entities between the A-party 40 and the MMTel AS 42 are not shown, and the SIP 100 Trying signalling is not shown.

At signal 401 the A-party 40 sends an Invite request for establishing a voice call. The Invite request 401 contains a Session Description Protocol (SDP) offer, indicating the characteristics of the media streams offered for this media session. The Invite request 401 also includes the Supported header as described earlier. The MMTel service determines that a pre-call announcement should be made to the A-party 40 and so, in signal 402, the MMTel AS 42 sends a 183 Session progress response to the A-party 40. The 183 Session progress signal 402 contains a request for a reliable provisional response and, in addition, an instruction to the A-party UA to play (stream) a designated announcement. For example, signal 402 may comprise the SIP instructions:

```
SIP/2.0 183 Session progress
...
Media: mmtel-files-v03.07.12\25
```

The SIP header Media: constitutes an instruction to play announcement 25 from media file mmtel-files-v03.07.12. There is not necessarily an SDP answer included in the 183 Session progress signal 402. The announcement media file is contained locally in the VoLTE device. The device may internally stream the announcement to the user by streaming the PCM from the identified media file directly to the media player in the terminal.

When the announcement has been played, the UA in the device of the A-party 40 sends an acknowledgement response, Prack 403, as the reliable provisional response that was required by the 183 Session progress signal 402. The Prack 403 indicates to the MMTel AS 42 that the playing of the announcement is complete and that the service logic may continue its processing. Note that the 183 Session progress signal 402 may be repeated a few times before the Prack 403 is returned because the sender of the request for a reliable provisional response expects an immediate response. In signal 404 the MMTel AS 42 replies to the A-party 40 with a SIP 200 OK. In signal 405 the MMTel AS 42 then forwards the Invite towards the destination party so that call establishment can continue.

Figure 5:
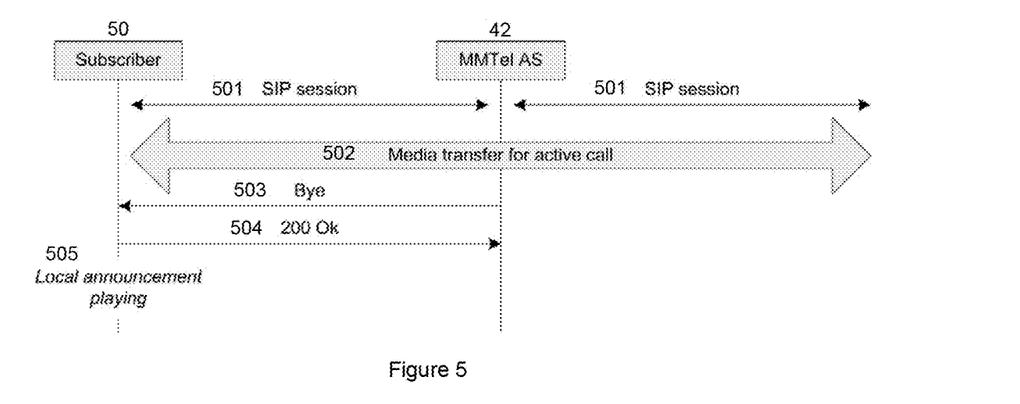
FIG. 5 is a signaling diagram illustrating the procedure for playing an end-of call announcement.

FIG. 5 is a signaling diagram illustrating the procedure for playing an end-of-call announcement. The entities include a SIP UA of a VoLTE subscriber 50 engaged in a call, who in this case may be the calling party (A-party) or the called party (B-party), and the MMTel AS 42, as described above in FIG. 4. The signaling exchange 501 and 502 represents an on-going call that is about to end.

In signal 503 the MMTel AS 42 sends a SIP Bye request to a VoLTE subscriber, who in this case may be the calling party (A-party) or the called party (B-party). The Bye request 503 contains an instruction to play a local announcement, for example:

```
Bye sip:245.33.87.34:5056 SIP/2.0
...
Media: mmtel-files-v03.07.12\20
```

In signal 504 the subscriber's SIP UA 50 responds with a 200 OK, as normal. At step 505, the UA 50 then starts streaming the media file of the requested end-of-call announcement (announcement 20 from media file mmtel-files-v03.07.12). There is no SDP negotiation needed for the playing of the local announcement. The Bye request 503 implies that the established user plane will be terminated.

Figure 6:
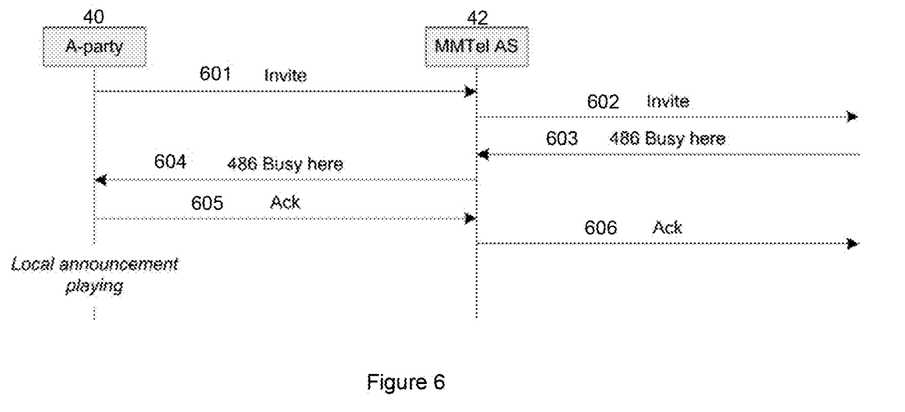
FIG. 6 is a signaling diagram illustrating the procedure for playing an announcement at call establishment failure.

FIG. 6 is a signaling diagram illustrating the procedure for playing an announcement at call establishment failure. The calling A-party 40 and MMTel AS 42 are the same as described above in FIG. 4. Signals 601 and 602 are SIP Invites sent from calling A-party to the called party (not shown). Signal 603 is a SIP '486 Busy here' message returned by the called party, and this signal is forwarded by the MMTel AS 62 to the A-party 40 in signal 604. The '486 Busy here' 604 also contains an announcement instruction in the form:

```
SIP/2.0 486 Busy here
...
Media: mmtel-files-v03.07.12\15
```

In signal 605 the SIP UA in the A-party's terminal device 40 sends a SIP 'Ack' in response to the '486 Busy here' 604, which is forwarded in signal 606 by the MMTel AS 42 towards the called party. At step 607, the SIP UA in the A-party device 40 plays the identified announcement media file (mmtel-files-v03.07.12\15). Note that it does not matter if there has already been a provisional SDP answer provided, or SDP negotiated because no SDP is required for the call failure announcement. The terminal can stream the media (e.g. PCM samples) of the stored announcement directly to the player in the terminal.

An end-of-call announcement may typically be a repeating announcement. For example the announcement may be played repeatedly until the user 'hangs up' (i.e. releases the connection). This may be accomplished with a media playing parameter like 'repeat', e.g.:

```
SIP/2.0 486 Busy here
...
Media: mmtel-files-v03.07.12\15; repeat=5
```

The parameter repeat=5 indicates that the announcement shall be repeated a maximum of five times.

Figure 7:
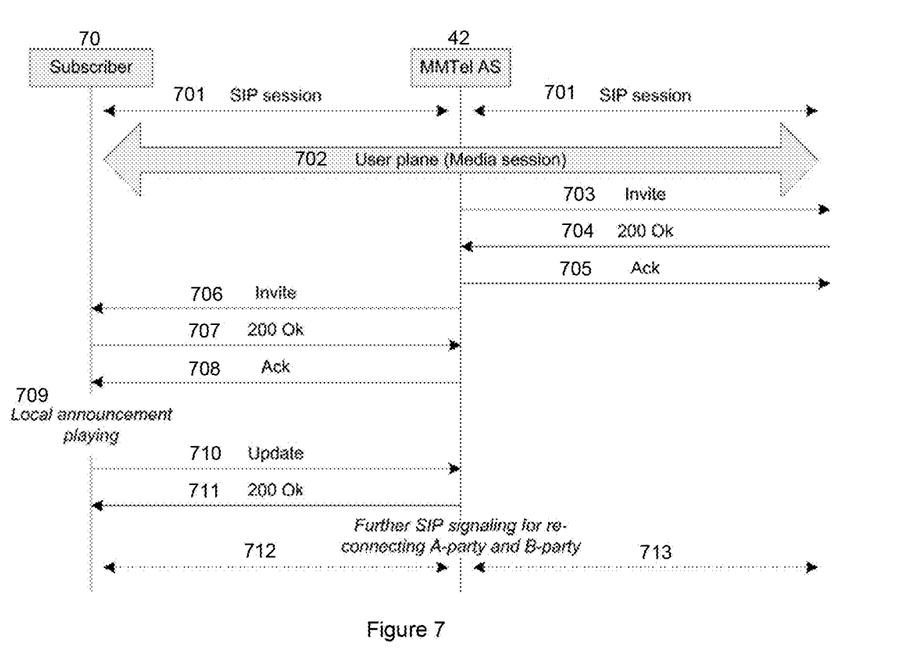
FIG. 7 is a signaling diagram illustrating the procedure for playing a mid-call announcement.

FIG. 7 is a signaling diagram illustrating the procedure for playing a mid-call announcement. The entities include a SIP UA in a device of a VoLTE subscriber 70 engaged in a call, to whom a mid-call announcement is to be played and who in this case may be the calling party (A-party) or the called party (B-party), and the MMTel AS 42, as described above in FIG. 4. The signaling exchange 701 and 702 represents an on-going call. In signals 703-705, in accordance with existing methodology, the MMTel AS 42 uses a SIP Invite transaction (re-Invite) to update the user plane (specifically the SDP) for the media connection of the remote party. Also, in signals 706-708, the MMTel AS 42 uses a similar re-Invite transaction to update the user plane for the media connection of the subscriber 70. In this embodiment, the Invite request 706 sent to the served subscriber 70 contains an instruction to apply local announcement playing. For example:

---
INVITE sip:245.33.87.34:5056 SIP/2.0
...
Media: mmtel-files-v03.07.12\10

---

In this example, the device is requested to play media file 10 from the set of media files mmtel-files-v03.07.12, to which it has access. At step 709 the device of the subscriber 70 plays the identified announcement media file. In signal 710, the SIP UA of the subscriber 70 sends an Update signal to indicate the completion of the playing of the announcement to the MMTel AS 42. When the MMTel AS 42 receives the Update signal 710, it responds with a SIP 200 OK message 711, and can then apply the required SIP signaling 712, 713 for reconnecting the parties to continue the call.

Figure 8:
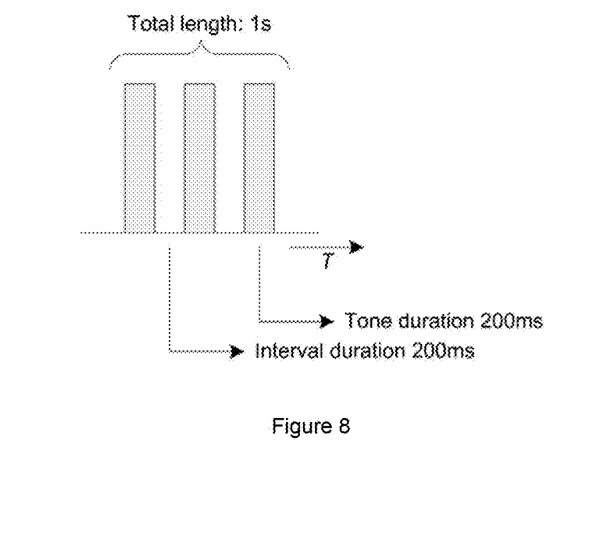
FIG. 8 is a graphical illustration of a pre-paid warning tone comprising a sequence of three tone pulses.

FIG. 8 is a graphical illustration of a pre-paid warning tone comprising a sequence of three tone pulses of 200 ms duration separated by 200 ms intervals. The concept of the pre-paid warning tone has been established in GSM/3G networks. As one example, a service control point (SCP) may have a 'Customised Applications for Mobile networks Enhanced Logic' (CAMEL) relationship with a Mobile Switching Centre (MSC), for applying on-line charging for a call. The SCP may at some point during the call instruct the MSC to inject a warning tone into the speech path. The MSC, with which the SCP has a CAMEL relationship, has a control relationship with a Media gateway (MGW). The user plane of the call traverses the MGW. This facilitates the MSC, under instruction of the SCP, to instruct the MGW to apply a warning tone in the call.

However, for IMS/MMTel networks, a problem arises because in an IMS network the media path (user plane) is not anchored in a MGW or MRF in the same way that the user plane is anchored in an MGW in a GSM/3G network. The only possibility for an MMTel-AS to inject a warning tone into the media path of an MMTel call is for it to temporarily modify the user plane of the call and establish a user plane connection between the served subscriber (SIP terminal) and an MRF. The MMTel-AS must then instruct that MRF to play the warning tone. Subsequently, MMTel-AS has to re-establish the user plane between each of the end-points. This method for playing a warning tone of Is total duration is cumbersome, requiring a large signaling overhead. In addition, the twofold re-establishment of the user plane may lead to interruptions in the voice or other media.

The same principles described above for call announcements may be used to provide a solution to this problem of inserting a warning tone. By including the pre-paid warning tone as one of the set of media files that are stored locally and to which the MMTel user equipment (UE) device has access, the MMTel AS may instruct the UE to play a specific, locally stored media file that comprises the (standardized) warning tone. The set of media files that include the announcements, as reported by the UE to the MMTel-AS at or prior to call establishment, includes the prepaid warning tone media file. This solution has the advantage that no (twofold) SDP update is needed, no MRF needs to be connected to the speech path and no control relationship between MMTel-AS and MRF needs to be established.

For example, one way in which the MMTel-AS can instruct the MMTel UE to play a warning tone is by sending a SIP 'Info' request, as defined in IETF RFC 6086. The instruction to play the warning tone may be contained in the body part of the Info request, in accordance with the syntax and semantics defined.

Figure 9:
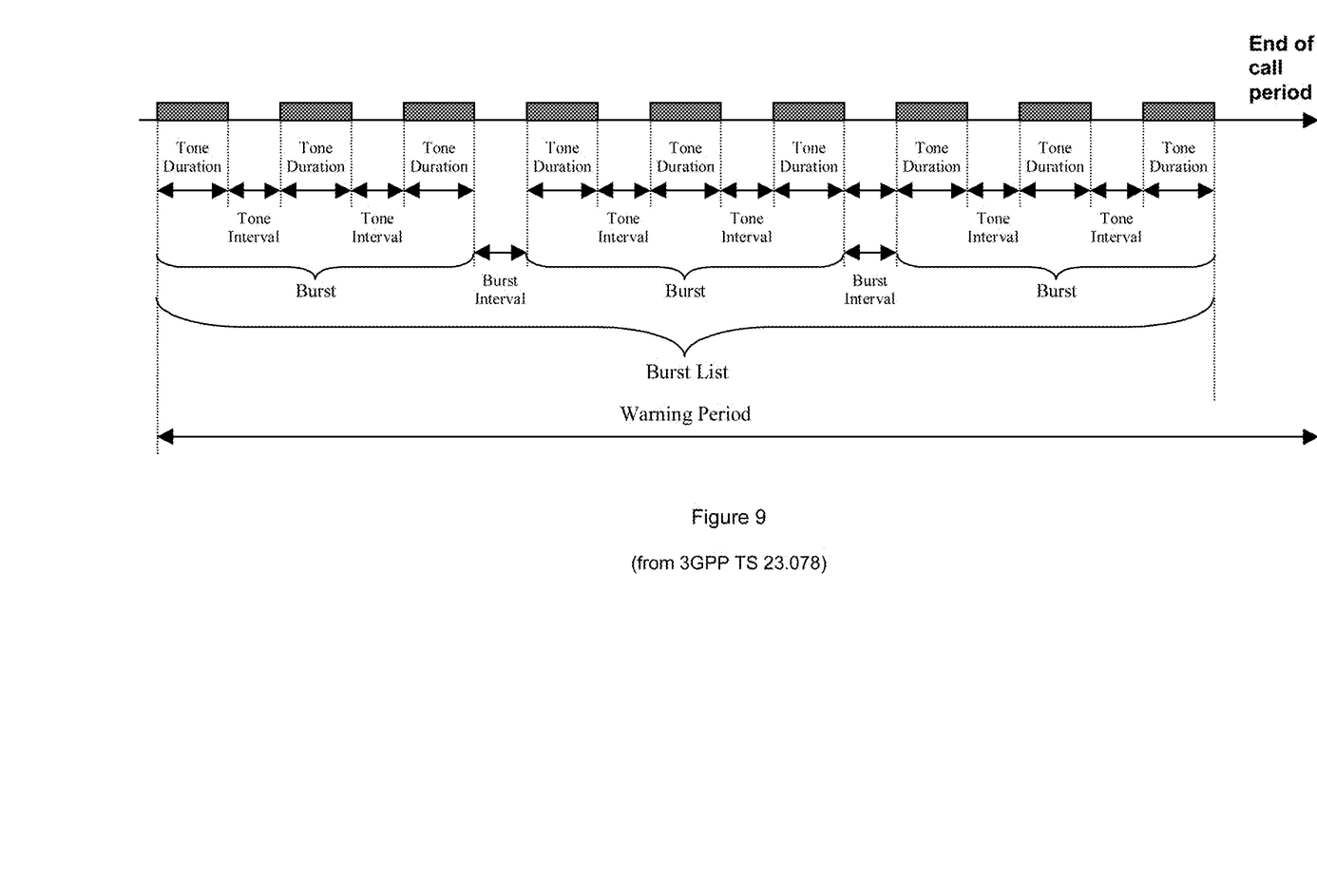
FIG. 9 is a graphical illustration of an example of a warning tone defined by tone parameters.

The warning tone characteristics (tone cadence, frequency, volume) may be standardized within the context of the MMTel announcement set, in the same manner as it is standardized for GSM/3G. Alternatively, or in addition, a flexible warning tone may be provided, in which the MMTel-AS includes in the SIP Info message a set of tone descriptors as parameters that define the warning tone. FIG. 9, which is reproduced from 3GPP TS 23.078, illustrates an example of a warning tone defined by such parameters, including a warning period (overall duration), a burst list comprising a number of bursts and intervals between bursts, and a tone duration and tone interval between tones that make up each of the bursts. The parameters of the flexible warning tone would then need to be standardized as part of the MMTel announcement set.

The MMTel UE reports its support of the prepaid warning tone to the MMTel-AS, following the procedure that is described above. For example, the SIP Supported header may comprise:

Supported: 100rel, media_streaming!ims.vodafone.uk/
media_files/mmtel/mmtel-files-v03.07.12

The option tag media_streaming!ims.vodafone.uk/media-_files/mmtel/mmtel-files-v03.07.12 relates to the locally stored announcement media files, that include the prepaid warning tones. Alternatively, a dedicated option tag may be used for this purpose, e.g.:

Supported: 100rel, media_streaming!ims.vodafone.uk/
media_files/mmtel/mmtel-files-v03.07.12, mmtel-warning-tones The option tag 'mmtel-warning-tones' indicates that the UE supports generation of the warning tones.

The embodiments described above include the MMTel AS providing both an instruction to the VoLTE subscriber to apply local media, and an indication of the actual media file to be streamed. Providing an indication of the actual media file to be streamed is sufficient for the playing of a single, entire announcement. However, a more complex situation may also be handled using a similar approach, such as involving user interaction in the collection of user input (e.g. digits), or in the playing of a concatenated announcement, but may require additional SIP signaling logic. An alternative method for defining the playing of a complex announcement (and collecting user input, when needed) is the use of media files that are programmed according to a predetermined protocol, such as Voice XML (extensible mark-up language).

Figure 10:
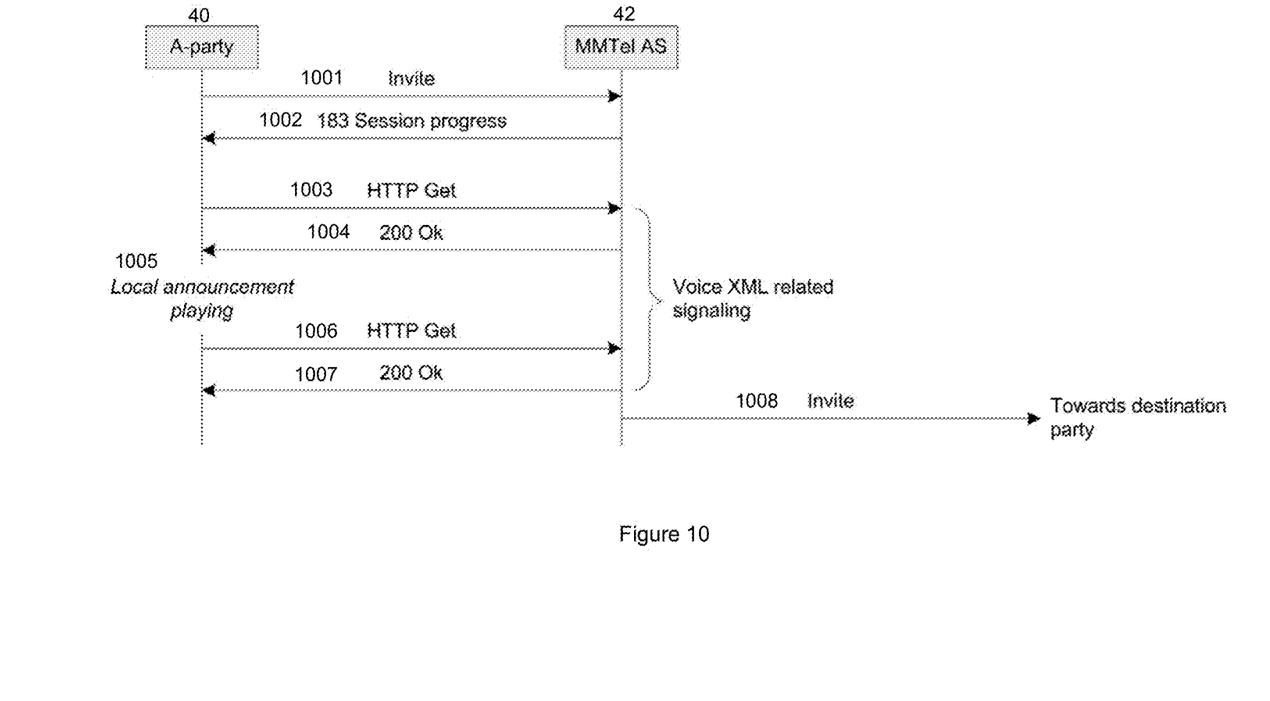
FIG. 10 is a signaling diagram illustrating an example of using Voice XML for a local announcement in a pre-call announcement.

FIG. 10 is a signaling diagram illustrating an example of using Voice XML for a local announcement and user interaction in a pre-call announcement. The calling A-party 40 and MMTel AS 42 are the same as described above in FIG. 4. Signal 1001 is a SIP invite from the VoLTE device of a calling A-party 40 that is routed via MMTel AS 42. The VoLTE device of the A-party 40 includes a phone application with an embedded Voice XML execution engine. Signal 1002 is a SIP 183 Session progress message sent from the MMTel AS 42 to the A-party 40 and contains an address and correlation identifier for establishing a Voice XML signaling relation. The Supported header comprises:

```
SIP/2.0 183 Session progress
...
Media: voicexml=http://mmtel-asl.ims.operator.se/voice-xml-scripts/voice-xml-
script_10.vxml<session-id>
```

The VoLTE device of A-party 40 uses mmtel-as1.ims.operator.se as an address for establishing the Voice XML relation. The VoLTE device of A-party 40 sends an HTTP Get command 1003 to that address, which will, by virtue of the Domain Name System (DNS) configuration, resolve into an IP address of the MMTel AS 42 serving this subscriber. The suffix <session-id> identifies the MMTel session to which this HTTP Get request is to be coupled. The MMTel AS 42 returns a 200 OK signal 1004, and there follows an exchange of Voice XML-related signaling by which the device of A-party 40 obtains and executes the required XML file(s).

As part of this procedure, the A-party 40 may be prompted to enter information (e.g. in the form of digits entered on a keypad). When the required XML files have been obtained, the device of A-party 40 executes them to play the announcement (step 1005). After the Voice XML execution is completed the device of A-party 40 exchanges a further HTTP Get transaction, 1006, 1007 with the MMTel AS 82. At that point, the MMTel service logic may continue call establishment, as shown by the Invite 1008 forwarded by the MMTel AS 42 towards the destination party. The device of A-party 40 is ready to receive SIP responses to the initial Invite request 1001.

The use of executable media files that are programmed according to a predetermined protocol, such as Voice XML, for the announcement playing and user interaction provides flexibility for executing (complex) scripts in the device. Although FIG. 10 illustrates a pre-call announcement/interaction, Voice XML may be used for pre-call, mid-call and end-of-call announcement/user interactions. When it is applied for an end-of-call announcement, then the MMTel service logic has to remain active until the announcement is complete because the Voice XML relation is terminated when the announcement is complete (i.e. has been played entirely). The last HTTP Get transaction 1006, 1007 takes place after the announcement is complete. Therefore, for the playing of a single end-of-call announcement, including both a successfully established call and an unsuccessful call establishment, it may be preferable to include the announcement instruction in the last request or response sent to the device of A-party 40. The MMTel service logic can then be terminated and the device of A-party 40 can play the local announcement without further interaction with the MMTel service logic.

Figure 11:
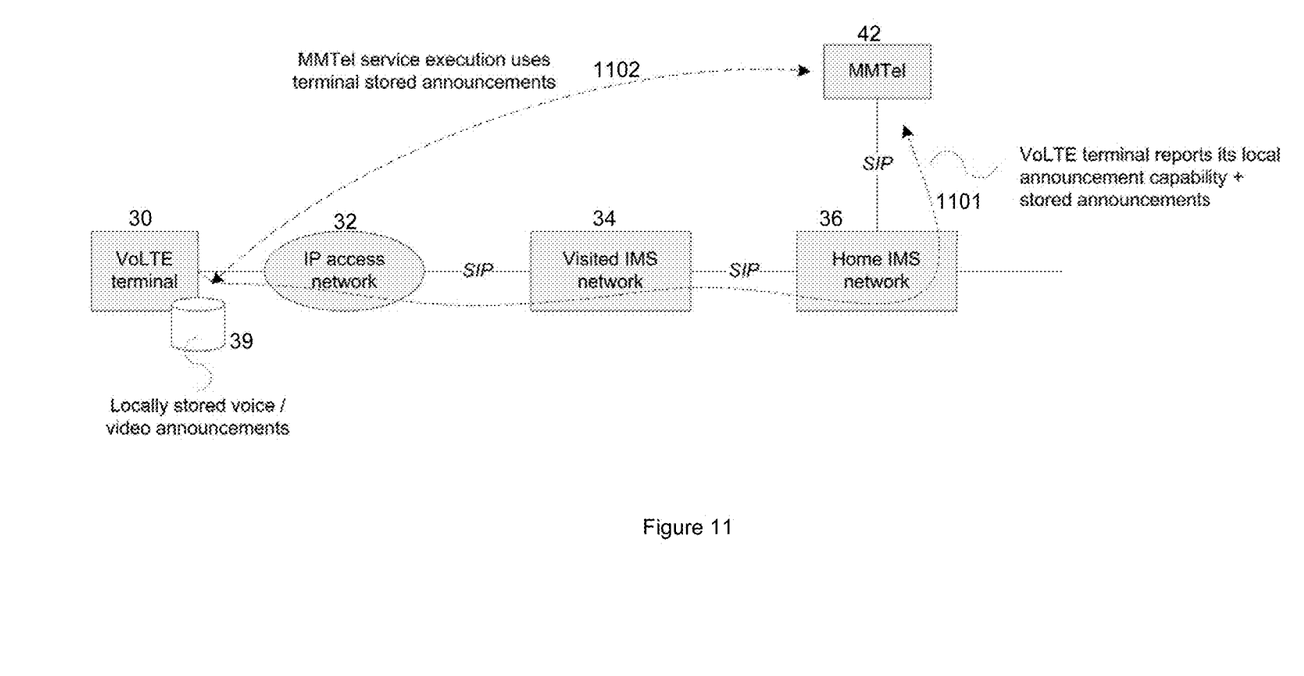
FIG. 11 is a block diagram, illustrating a summary of procedures for playing announcements.

FIG. 11 summarises the procedures described above in relation to the simplified network architecture of FIG. 3 and uses the same reference numerals for the same entities. In addition FIG. 11 shows the MMTel AS 42, as described above in FIG. 4, connected into the Home IMS network 36. As represented by the single arrow-headed dashed line 1101, the VoLTE device 30 reports its local announcement capability and locally stored announcement media files to the MMTel AS 42. Use of the terminal-resident media files for the playing of a local announcement at the device 30 is represented by the double arrow-headed dashed line 1102 between the MMTel AS 35 and the VoLTE device 30.

Figure 12:
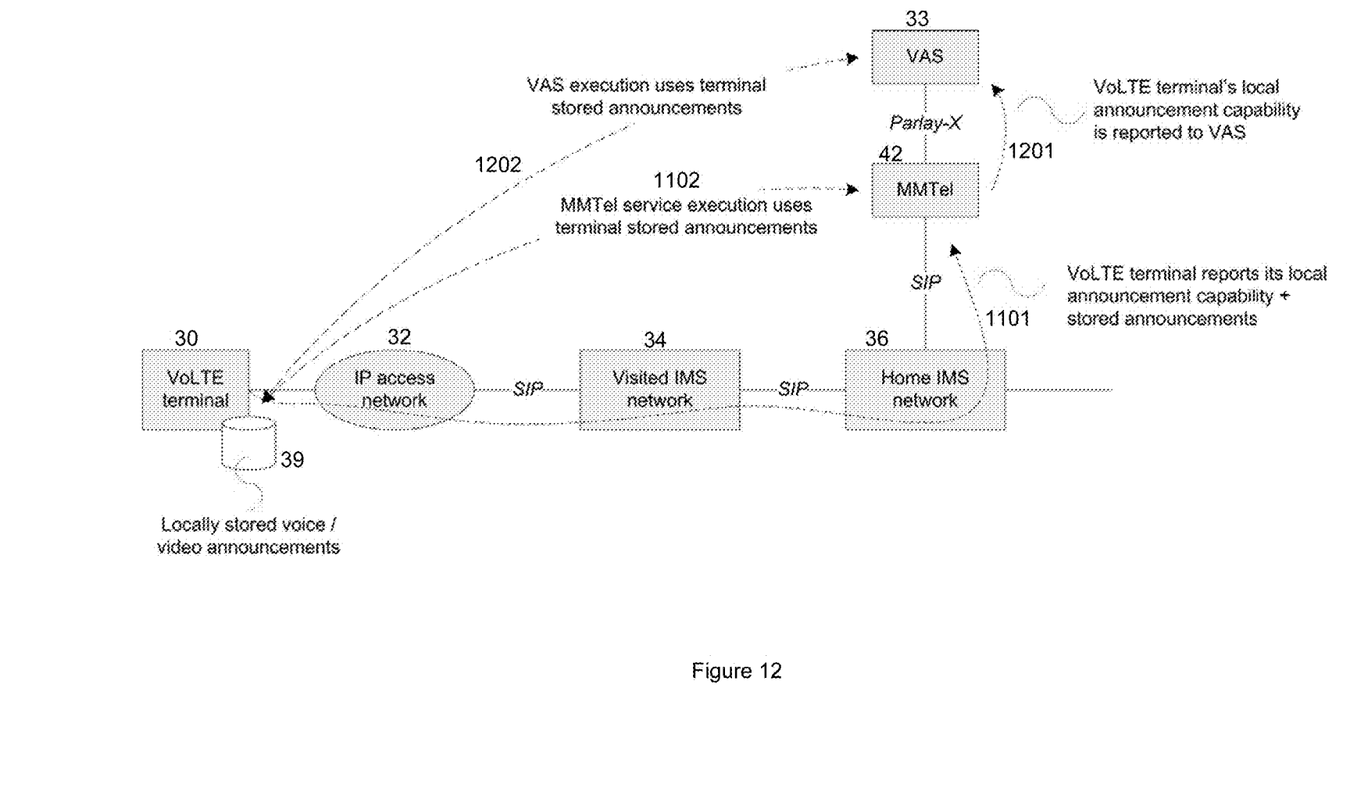
FIG. 12 is a block diagram depicting an extension of the architecture of FIG. 11 for an embodiment that also employs a Value Added Service, VAS.

FIG. 12 depicts an extension of the architecture of FIG. 11 for an embodiment that also employs a Value added service from a Value Added Application Server (VAS) 33. The same reference numerals are used for the same entities as in FIG. 11. The VAS 33 communicates with the MMTel AS 42 using (a variant of) Parlay-X. When the VoLTE device 30 establishes a call (e.g. voice and/or video), there is SIP signaling with MMTel AS, as normal. As described above for FIG. 11, line 1101 represents the terminal's local announcement capability being reported to MMTel AS 42, enabling the MMTel AS 42 to utilize it for making the terminal 30 play a specified announcement media file using the MMTel logic execution. The VAS 33 includes service logic that may be invoked, by the MMTel AS 42, for a multimedia communication session. When VAS 33 has gained control over the call, through the Parlay-X protocol with MMTel AS 42, it may provide instructions to MMTel-AS 42 about how to further handle the multimedia session. The Parlay-X path is represented by the dashed-line arrow 1201.

The VAS logic invocation 1201 includes information about the terminal's local announcement capability. The VAS 33 can now also utilize this capability. Specifically, when the VAS 33 needs an announcement to be played to the served subscriber, it first determines from the reported device capability that the required announcement is locally available in the device. The VAS logic can now, through signaling over Parlay-X, instruct the device 30 to play a specific local announcement. This is represented by the double arrow-headed dashed line 1202 between the VAS 33 and the VoLTE terminal 30. In this embodiment, the VoLTE provisioning system should ensure that the media files that the VAS 33 may want to have played at the device 30 are provided to the VoLTE device 30. For example, the file set mmtel-files-v03.07.12 in the examples described above, may include media files needed for the regular MMTel service as well as media files for the specific value added service provide by VAS 33.

Figure 13:
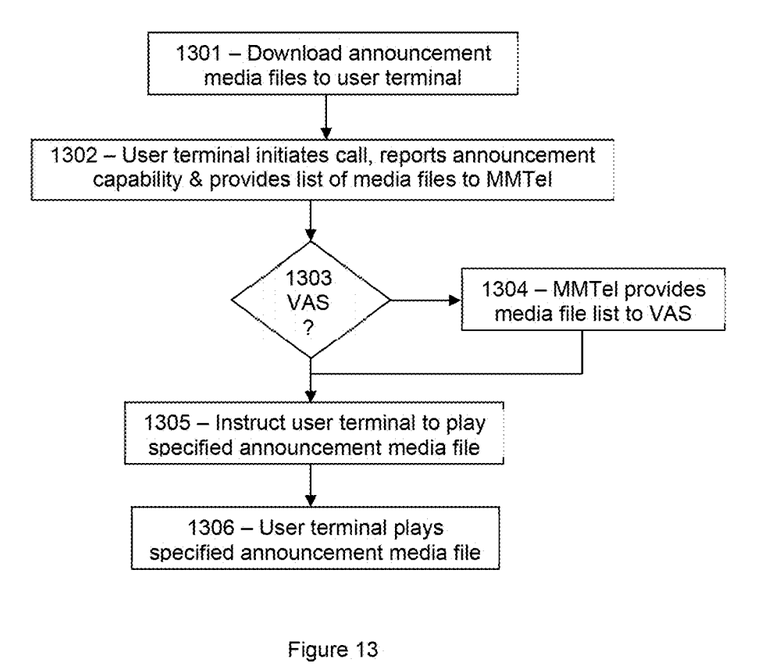
FIG. 13 is flowchart depicting the principal method steps involved in the embodiments.

FIG. 13 is a flow chart depicting the principal method steps involved in the embodiments described above. At step 1301 announcement media files are downloaded to the user terminal device (e.g. VoLTE terminal) of a subscriber, to be stored in a memory accessible to the device. This may occur prior to the device initiating a call. At step 1302, the device initiates a multimedia call and reports its announcement capability and list of available media files to the MMTel AS. At step 1303 the MMTel AS determines whether there is also a Value-added service that may be applied to the call. If there is, then at step 1304 it provides the list of available media files to the associated VAS. At step 1305 the MMTel AS determines that an announcement is to be made, and instructs the device to play a specified one of the listed media files. At step 1306 the device plays the announcement by streaming the specified media file so that the announcement is played on a user interface associated with the device (e.g. speaker, display screen etc.)

Figure 14:
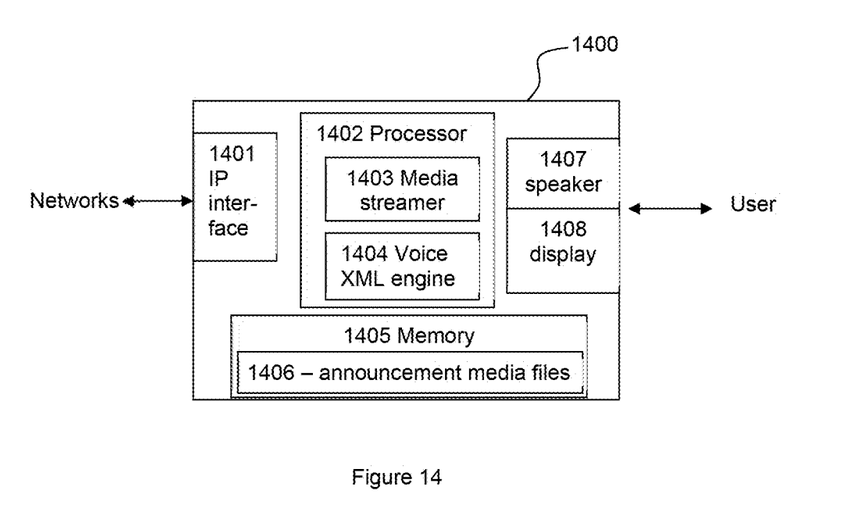
FIG. 14 is a block diagram illustrating the principal functional components of an embodiment of a device configured for communications over an IP network.

FIG. 14 is a block diagram illustrating the principal functional components of an embodiment of a device 1400 configured for communications over an IP network. Device 1400 includes an IP interface 1401 through which control plane and user plane signals are sent and received between the device 1400 and the IP network(s). The device also includes a processing capability 1402, that includes a media streamer 1403 for streaming media files. Optionally, the processor 1402 may also include a phone application with an embedded Voice XML execution engine 1404 or similar capability for executing media files that are programmed according to a predetermined protocol. The device 1400 also includes memory 1405 on which are stored announcement media files 146. As discussed above, the memory 1405 may be a memory built into the device 1400, or the device 1400 may comprise a memory interface for accessing data that is stored in a memory device that is insertable into (and removable from) the device, such as a UICC. The device 1400 also includes a user interface, which in the depicted embodiment includes a speaker 1407 and display 1408, on which the media contained in media files 1406 can be played to the user. Again, as described above, the user interface may form part of the device 1400, as shown, or may be an interface with which the device has a wired or wireless connection.

Figure 15:
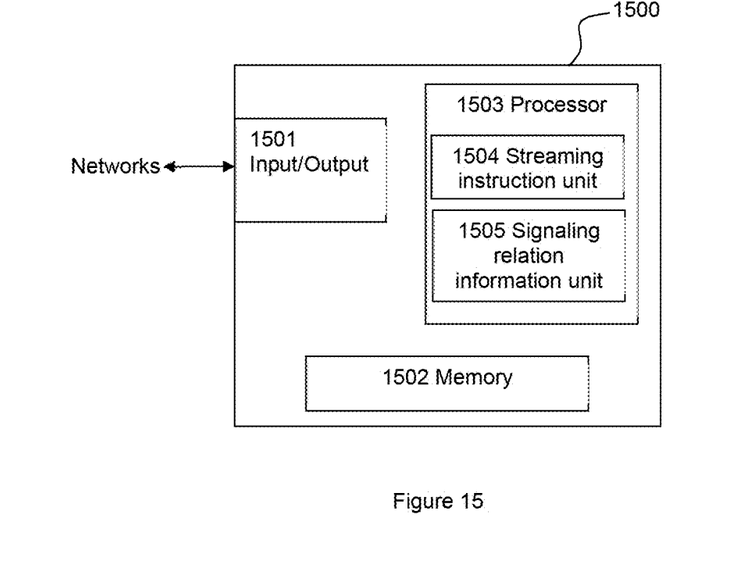
FIG. 15 is a block diagram illustrating the principal functional components of a Muli Media Telephony (MMTel) server.

FIG. 15 is a block diagram illustrating the principal functional components of A Multimedia Telephony, MMTel, application server 1500. The server 1500 includes an input/output 1501 through which signalling/messages are sent and received to/from other network entities. A memory 1502 stores data and programming instructions. A processor 1503 executes the programming instructions, which configure the server 1500. Within the processor 1503 is a streaming instruction unit 1504 and a signalling relation information unit 1505. The MMTel server 1500 receives, via the input/output 1501, an indication from a device engaged in a communication session over an IP network, or during establishment of the session, that the device has access to one or more information media files. The signalling relation information unit 1505 determines, from the signals received from the network, when an announcement (or other information) contained in one of the information media files should be streamed at the device. The program instructions configure the streaming instruction unit 1504 to provide an instruction, via the input/output 1501, to the device to stream one or more of the information media files so as to play the information therein on a user interface. The instruction to the device identifies the information media file(s) to be played.

The embodiments described above facilitate playing media files such as announcements, and applying user interaction, locally from a device connected to an IP network, such as a VoLTE terminal. A standardized set of announcements, which may be auto-provisioned in the terminal, is reported to the MMTel service logic at call establishment. The MMTel service logic, as part of its service logic execution, may then instruct the terminal to play any of the announcements. The method may be extended such that Value added services (VAS) can make use of these local announcements. The embodiments are mainly described for audible announcements, but are equally applicable for other media such as video announcements where video files (e.g. *.mpg) would be provisioned to the device, in the same manner as the audio files. Although embodiments describe usage by a VoLTE terminal, the method is applicable to MMTel devices in general, e.g. (nomadic) Ethernet/wireline, WLAN, Cable etc.

The embodiments described facilitate playing of terminal-resident media to, and user interaction with, an MMTel subscriber, without the need for establishing a media connection between the subscriber's terminal and an MRF (e.g. in the Home IMS network). As a result, a substantial saving in media transmission overhead may be realized, particularly for VoLTE calls. In addition, streaming of the media locally from the terminal, as opposed to from a (remotely located) MRF, can improve the user experience since there will be less latency for user interaction (announcement playing). This alleviates a significant problem in the playing of announcements for roaming VoLTE subscribers.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a wireless communication device, the method comprising:
   selecting a media file stored in a memory of the wireless communication device, in response to receiving a local announcement instruction from an Internet Protocol (IP) network while the wireless communication device is engaged in a communication session over the IP network; and
   playing, via a user interface of the wireless communication device, the media file as a local announcement for a user of the wireless communication device.

2. The method of claim 1, wherein the wireless communication device stores multiple media files, and wherein the media file is selected by the wireless communication device according to the local announcement instruction.

3. The method of claim 2, wherein the multiple media files correspond to different local announcements, wherein the local announcement instruction indicates a particular local announcement to be played as the local announcement, and wherein the method includes the wireless communication device selecting the media file from among the multiple media files, based on the media file corresponding to the particular local announcement.

4. The method of claim 1, wherein the method further comprises the wireless communication device including an indication in communication session signaling sent from the wireless communication device to the IP network for conducting the communication session, the indication indicating that the wireless communication device is configured for making local announcements in conjunction with conducting IP-based communication sessions.

5. The method of claim 4, further comprising sending, as the indication or in conjunction with sending the indication, information identifying media files stored in the memory, where each media file corresponds to a respective local announcement, to enable the IP network to identify which local announcements can be made by the wireless communication device.

6. The method of claim 1, further comprising receiving the media file from the IP network, either in advance of or in conjunction with conduct of the communication session.

7. A wireless communication device comprising:
   memory;
   a user interface; and
   a processor configured to:
      select a media file stored in the memory, in response to receiving a local announcement instruction from an Internet Protocol (IP) network while the wireless communication device is engaged in a communication session over the IP network; and play, via the user interface, the media file as a local announcement for a user of the wireless communication device.

8. The wireless communication device of claim 7, wherein the wireless communication device stores multiple media files, and wherein the media file is selected by the processor according to the local announcement instruction.

9. The wireless communication device of claim 8, wherein the multiple media files correspond to different local announcements, wherein the local announcement instruction indicates a particular local announcement to be played as the local announcement, and wherein the processor is configured to select the media file from among the multiple media files, based on the media file corresponding to the particular local announcement.

10. The wireless communication device of claim 7, wherein the processor is configured to include an indication in communication session signaling sent from the wireless communication device to the IP network for conducting the communication session, the indication indicating that the wireless communication device is configured for making local announcements in conjunction with conducting IP-based communication sessions.

11. The wireless communication device of claim 10, wherein the processor is configured to send, as the indication or in conjunction with sending the indication, information identifying media files stored in the memory, where each media file corresponds to a respective announcement, to enable the IP network to identify which local announcements can be made by the wireless communication device.

12. The wireless communication device of claim 7, wherein the processor is configured to receive the media file from the IP network, either in advance of or in conjunction with conduct of the communication session.

* * * * *